US012794916B2

(12) United States Patent
Lingarkar et al.

(10) Patent No.: US 12,794,916 B2
(45) Date of Patent: Nov. 10, 2026

(54) SYSTEM AND PROCESS FOR DATA SUBJECT ACCESS REQUESTS VIA A TRUST CENTER PLATFORM INTEGRATED WITH AN AI-COMPLIANCE PLATFORM

(71) Applicant: AKITRA, INC., Sunnyvale, CA (US)

(72) Inventors: Ravi Lingarkar, Sunnyvale, CA (US); Naveen S. Bisht, Sunnyvale, CA (US); Ravi Someshwar, Sunnyvale, CA (US)

(73) Assignee: AKITRA, INC., Sunnyvale, CA (US)

( * ) Notice: Subject to any disclaimer, the term of this patent is extended or adjusted under 35 U.S.C. 154(b) by 3 days.

(21) Appl. No.: 18/671,842

(22) Filed: May 22, 2024

(65) Prior Publication Data

US 2024/0314156 A1 Sep. 19, 2024

Related U.S. Application Data

(63) Continuation-in-part of application No. 18/176,325, filed on Feb. 28, 2023, which is a continuation-in-part of application No. 16/942,639, filed on Jul. 29, 2020, now Pat. No. 11,601,455, which is a continuation of application No. 16/006,707, filed on Jun. 12, 2018, now Pat. No. 10,771,489.

(51) Int. Cl.

| | |
|---|---|
| ***H04L 9/40*** | (2022.01) |
| ***G06F 16/22*** | (2019.01) |
| ***G06N 7/01*** | (2023.01) |

(52) U.S. Cl.
CPC .......... *H04L 63/1425* (2013.01); *G06F 16/22* (2019.01); *G06N 7/01* (2023.01)

(58) Field of Classification Search
CPC ..... H04L 63/1425; G06F 16/22; G06F 21/62; G06F 21/6245; G06F 40/30; G06F 40/40; G06N 7/01; G06N 20/00; G06Q 50/26
See application file for complete search history.

(56) References Cited

PUBLICATIONS

Gartner: "Defining Intrusion Detection and Prevention Systems". www.gartner.com/en/documents/3449317/defining-intrusion-detection-and-prevention-systems. Retrieved Sep. 20, 2016.
Kirda et al., "Recent Advances in Intrusion Detection", 12th International Symposium, RAID, Jul. 2009, Springer-Verlag Berlin Heidelberg, Germany.
Pietro et al., Intrusion Detection Systems (Advances in Information Security), Springer Science+Business Media, LLC., 2008, pp. 1-13, New York, NY.
Scarfone et al., Guide to Intrusion Detection and Prevention Systems (IDPS), National Institute of Standards and Technology, Special Publication 800-94, Feb. 2007, pp. 1-1-C-5.
Thomas, Snort Primer: A FAQ Based Introduction To The Most Popular Open-Source IDS/IPS Program, Nov. 27, 2015, CreateSpace Independent Publishing Platform.

*Primary Examiner* — Brian F Shaw
(74) *Attorney, Agent, or Firm* — Ogawa P.C.

(57) ABSTRACT

This present invention provides a method and system configured for handling DSARs within regulated environments, emphasizing efficiency, compliance, and transparency. By incorporating AI, NLP, and automated data management technologies, the invention provides a system and method for significantly reducing manual effort and improves compliance outcomes.

18 Claims, 9 Drawing Sheets

System Overview Diagram

FIGURE 2 System Overview Diagram
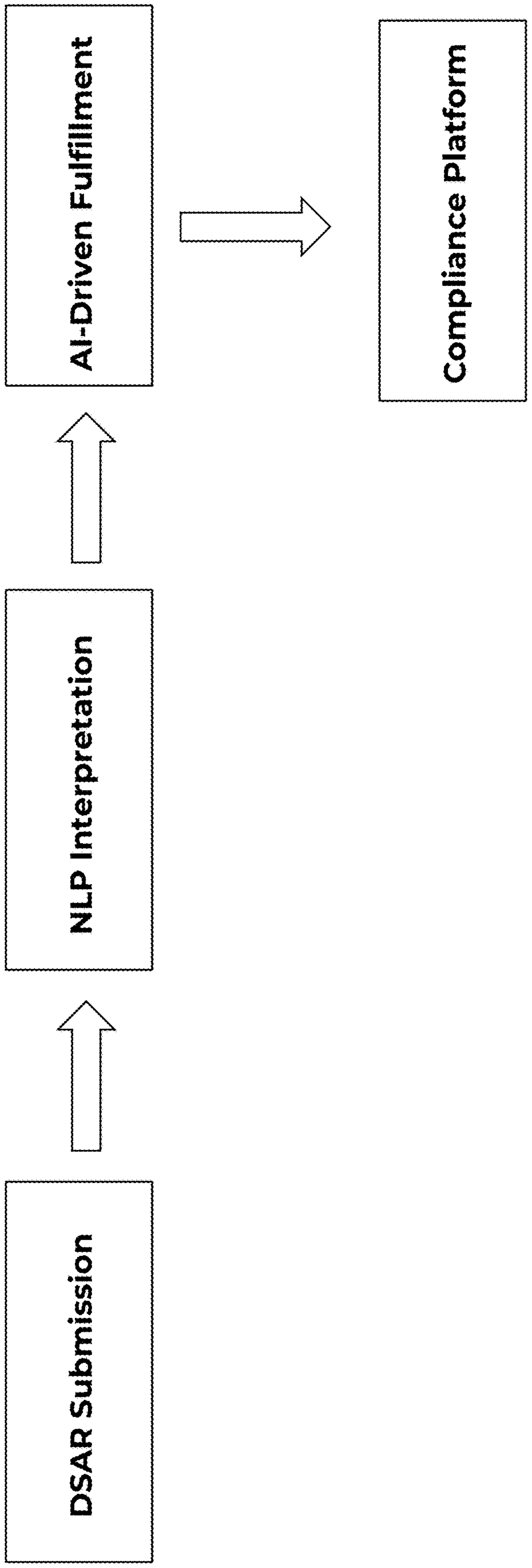

FIGURE 3 DSAR Submission Process Flowchart
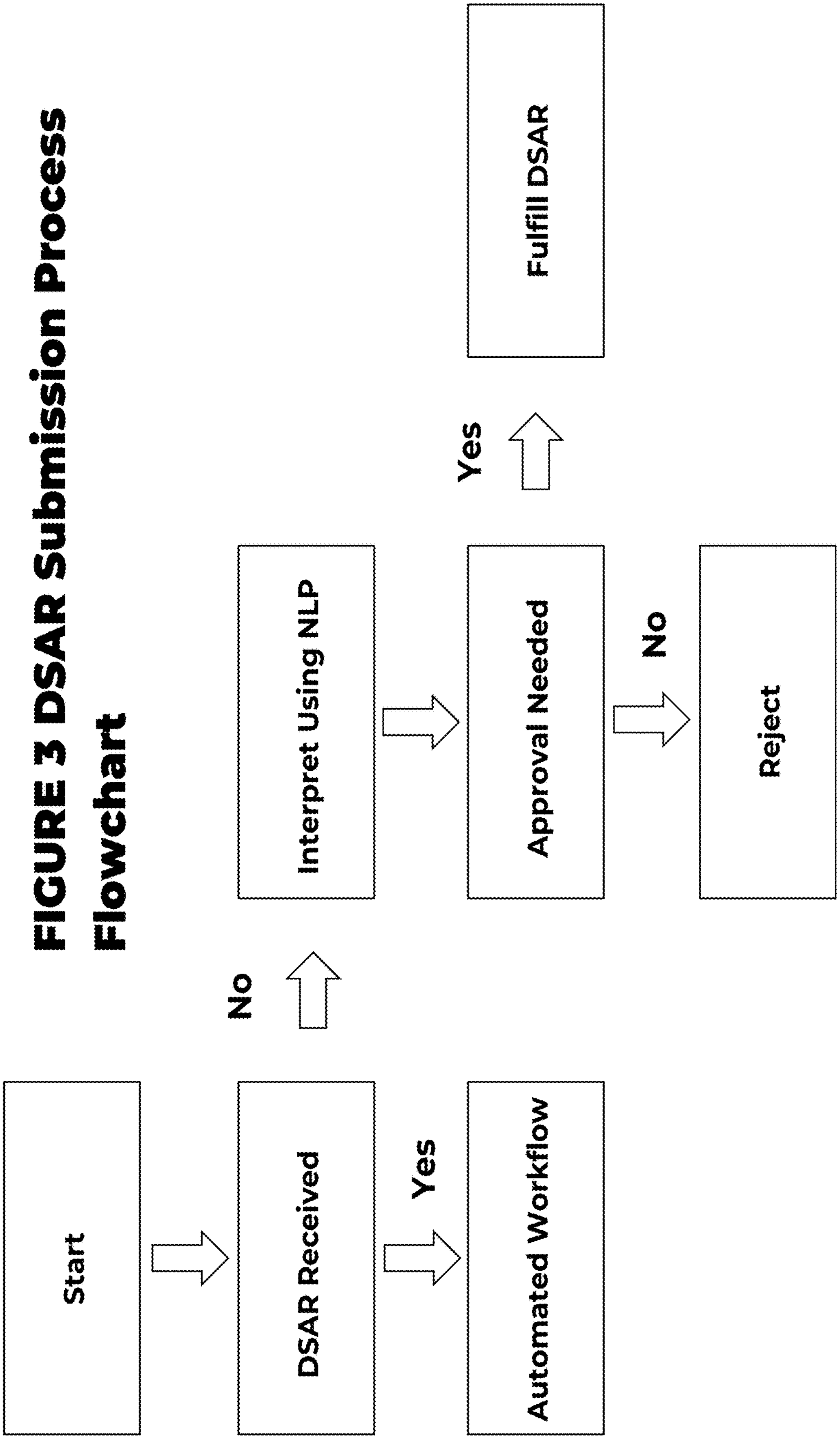

FIGURE 4 User Verification Process Diagram
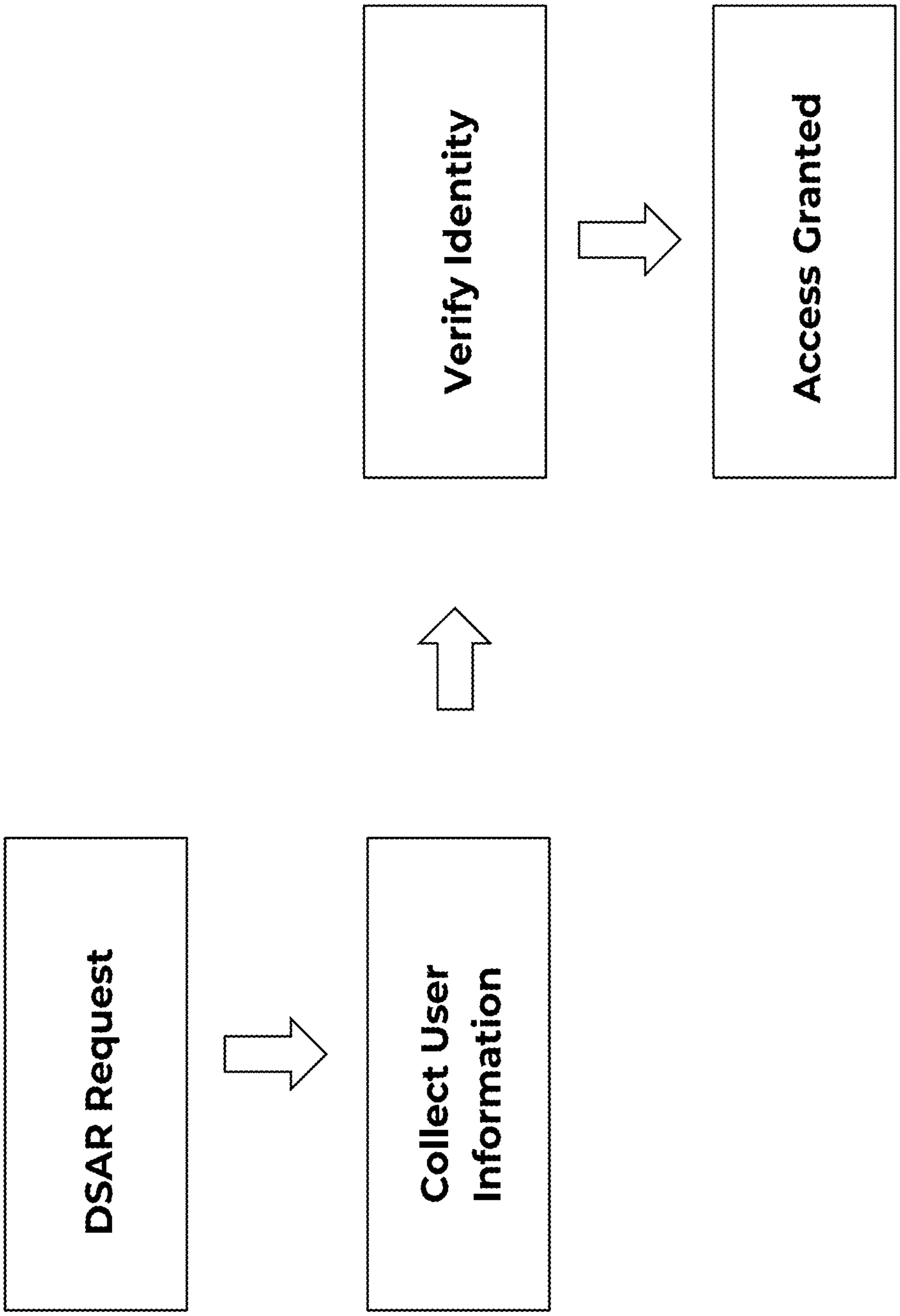

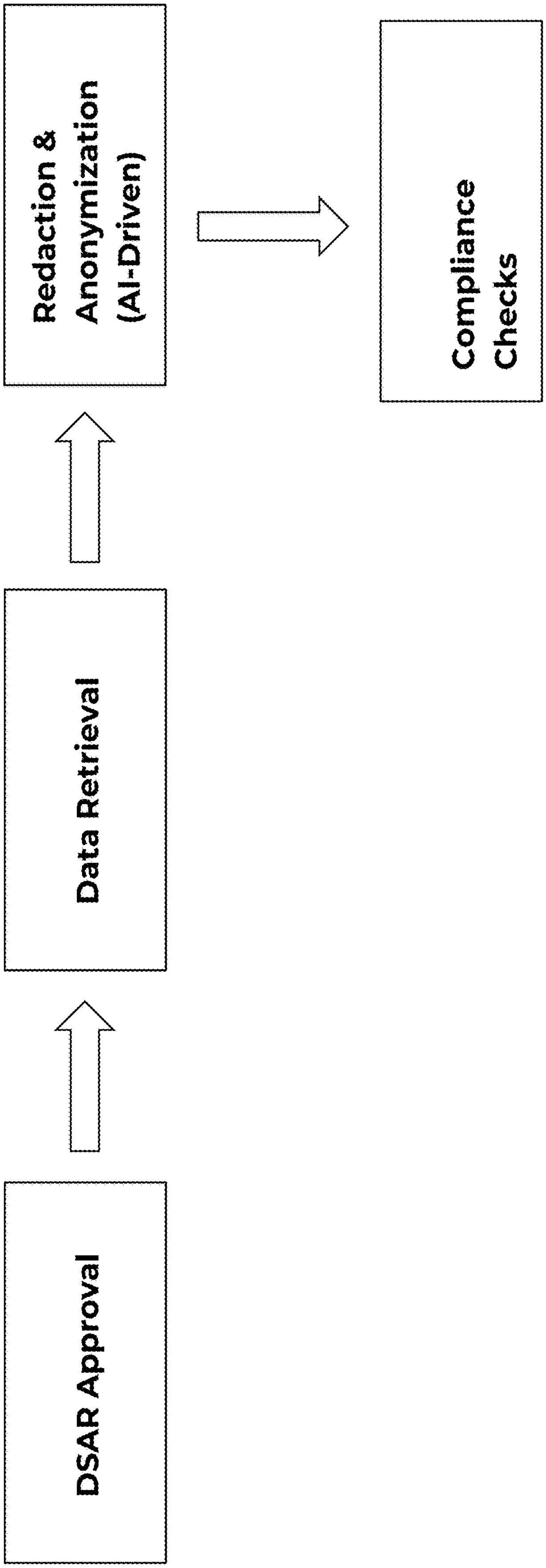
FIGURE 5 AI-Driven Workflow and Data Management Diagram

FIGURE 6 Data Fulfillment and Integration Diagram
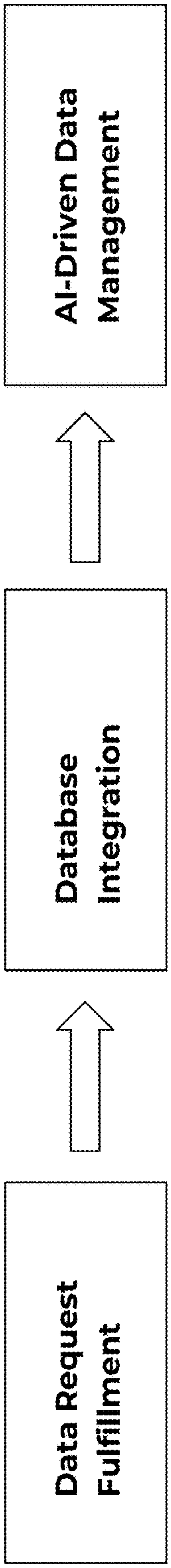

FIGURE 7 Metrics Dashboard Architecture Diagram
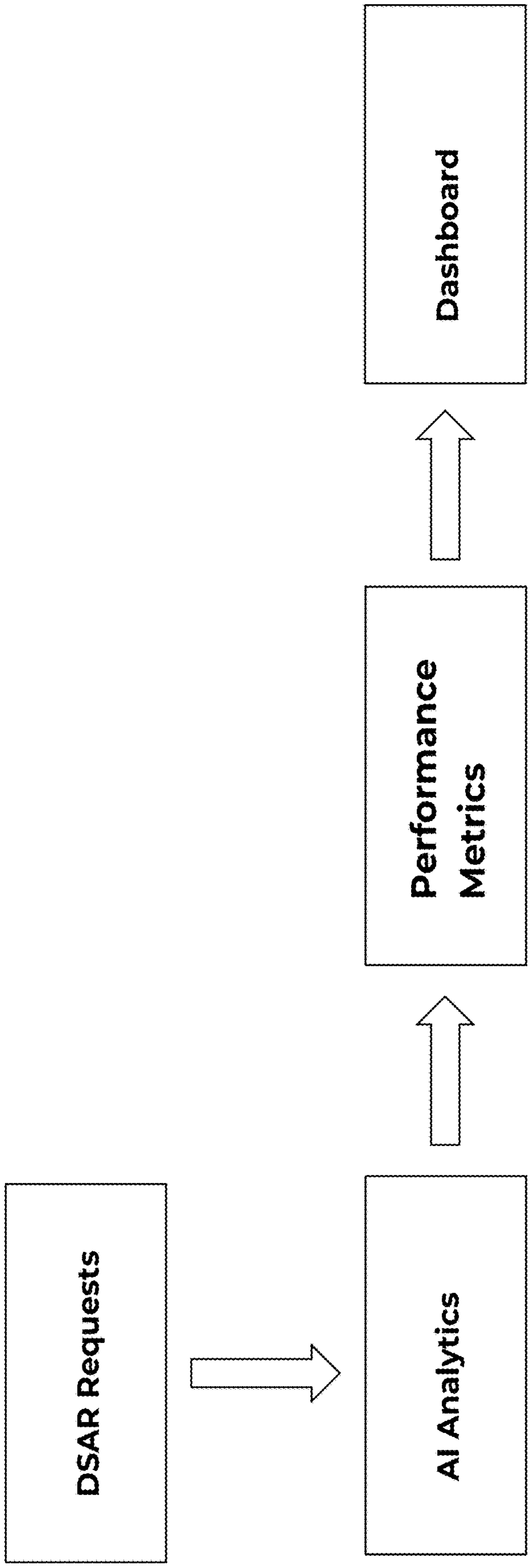

FIGURE 8 Compliance Platform Integration Diagram
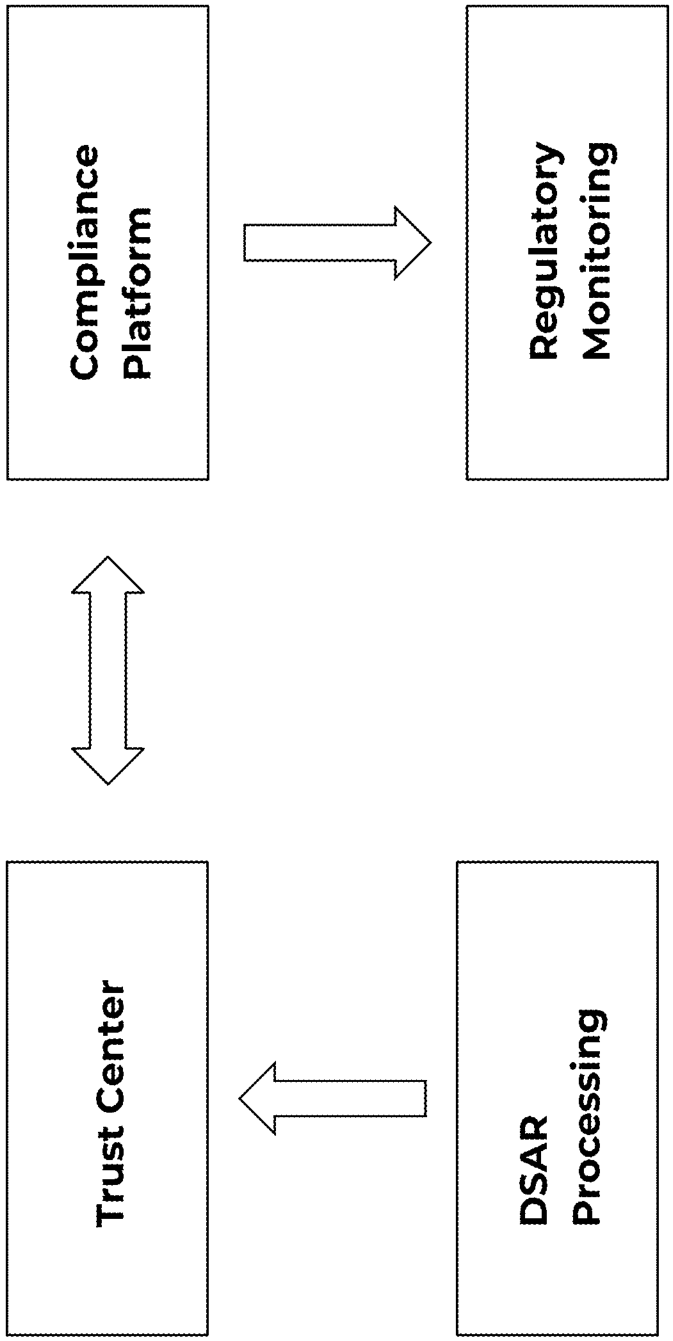

FIGURE 9 Security and Privacy Features Diagram
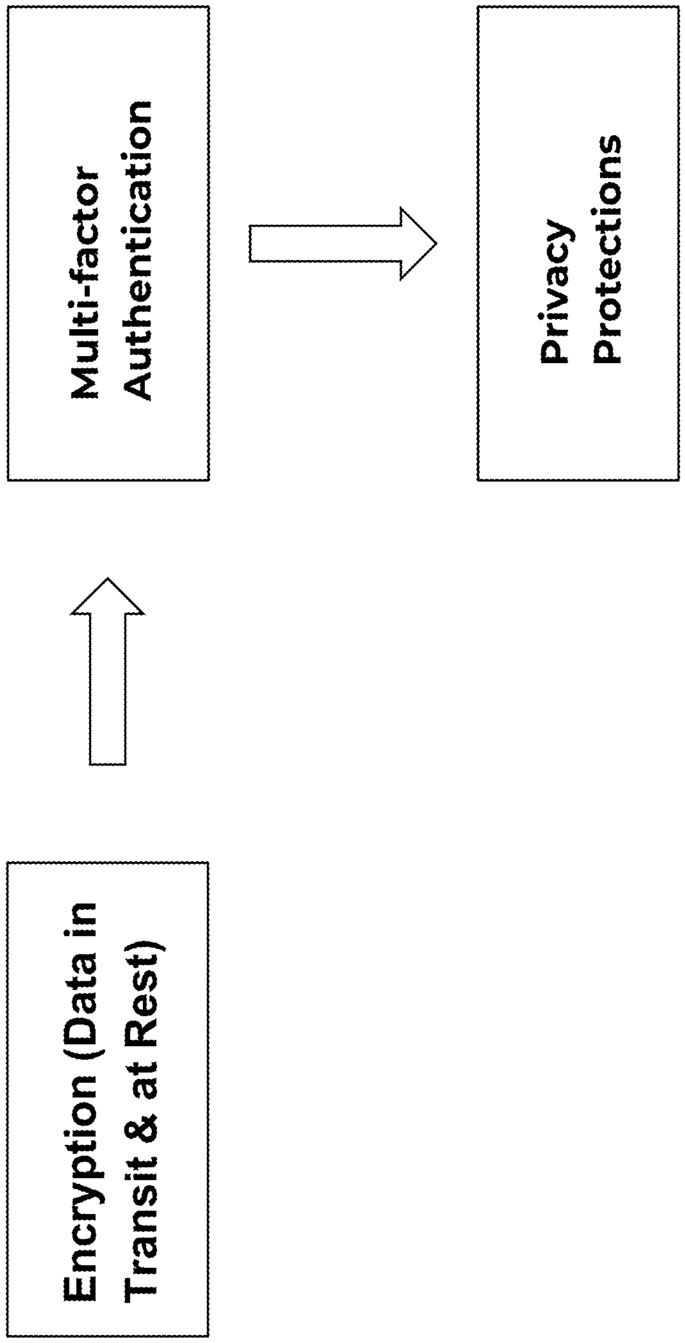

SYSTEM AND PROCESS FOR DATA SUBJECT ACCESS REQUESTS VIA A TRUST CENTER PLATFORM INTEGRATED WITH AN AI-COMPLIANCE PLATFORM

RELATED APPLICATIONS

This application is a continuation in part of and claims priority to U.S. Ser. No. 18/176,325 filed Feb. 28, 2023, which is a continuation in part of U.S. Ser. No. 16/942,639 filed Jul. 29, 2020, now issued as U.S. Pat. No. 11,601,455 on Mar. 7, 2023, which is a continuation of and claims priority to U.S. patent application Ser. No. 16/006,707 filed Jun. 12, 2018, now issued as U.S. Pat. No. 10,771,489 on Sep. 8, 2020, each of which is commonly assigned, and hereby incorporated herein by reference in its entirety.

BACKGROUND OF INVENTION

The invention provides a system and method in the field of data privacy and compliance, configured for introducing an automated and AI-driven approach to DSAR processing that ensures regulatory adherence, operational efficiency, and enhanced user experience.

A Data Subject Access Request (DSAR) system is a mechanism that allows individuals to request access to their personal data that is held by an organization. The systems are important for ensuring compliance with data protection regulations such as the General Data Protection Regulation (GDPR) in the European Union, California Consumer Privacy Act, and similar laws in other jurisdictions.

Conventional DSAR systems and their limitations are described as follows. DSAR systems typically involve the collection, storage, and organization of personal data belonging to individuals. The data may include information such as contact details, transaction history, preferences, and any other data that the organization holds about the individual.

Additionally, DSAR systems facilitate the handling of access requests from individuals. The handling includes receiving requests, verifying the identity of the requester, processing the requests within the legally mandated timeframes (usually within 30 days under GDPR), and providing the requested information in a clear and understandable format.

Other DSAR systems often incorporate robust security measures to protect the personal data being accessed. This may include encryption, access controls, audit trails, and other security mechanisms to prevent unauthorized access or data breaches. Many DSAR systems leverage automation and workflow management tools to streamline the request handling process. Automation can help in tasks such as identity verification, data retrieval, redaction of sensitive information, and response drafting, thereby improving efficiency and reducing the risk of errors.

Still further, DSAR systems may integrate with other internal systems such as customer relationship management (CRM) systems, document management systems, and data repositories to facilitate seamless access to the requested data.

However, DSAR systems also have limitations and challenges for data compliance. implementing and maintaining a DSAR system can be complex and costly, especially for small and medium-sized enterprises (SMEs) with limited resources. This may include expenses related to software licensing, infrastructure, personnel training, and ongoing support. Ensuring the accuracy and completeness of the data provided in response to DSARs can be challenging, especially in organizations with large volumes of data stored across disparate systems. Inaccurate or incomplete data can lead to compliance issues and erode trust with data subjects. DSAR systems may inadvertently expose sensitive personal data to unauthorized individuals if adequate security measures are not in place. This could result in data breaches, regulatory fines, and reputational damage to the organization.

Furthermore, data protection laws and regulations vary across jurisdictions and are subject to frequent updates and interpretations by regulatory authorities. Ensuring compliance with these requirements can be complex, especially for organizations operating in multiple regions. Moreover, organizations may face resource constraints in terms of personnel, technology, and expertise needed to effectively manage DSARs. This can lead to delays in processing requests, inadequate responses, and increased risk of non-compliance.

While DSAR systems play an important role in enabling individuals to exercise their data protection rights, organizations must carefully consider the associated challenges and limitations to ensure effective compliance with data protection regulations. This involves implementing robust technical, organizational, and procedural measures to address privacy risks and uphold data subjects' rights.

As the complexity of DSAR processing has grown with stricter data privacy regulations. Conventional manual handling is inefficient and prone to errors, underscoring the need for an automated and intelligent solution.

SUMMARY OF INVENTION

This system revolutionizes DSAR fulfillment by leveraging AI, NLP, and automated data management technologies, integrating with a Trust Center and compliance platform to streamline the entire process from submission to fulfillment.

This invention relates to an advanced system and method for the automated processing of Data Subject Access Requests (DSARs) through an AI-enhanced Trust Center platform. This system is designed to improve data privacy compliance and operational efficiency by employing Natural Language Processing (NLP) for interpreting DSAR submissions, automated redaction and anonymization for personal data protection, and intelligent integration with customer databases for seamless data management. Integrated with a compliance platform, the system ensures adherence to regulatory standards while offering a user-friendly interface for DSAR submissions, automated workflow for request processing, and a metrics dashboard for performance tracking.

This groundbreaking and innovative system represents a quantum leap in the landscape of DSAR (Data Subject Access Request) fulfillment, positioning itself as a pinnacle of technological advancement through its astute utilization of AI, NLP (Natural Language Processing), and automated data management technologies. With a keen focus on optimizing every facet of the DSAR process, from initial submission to comprehensive fulfillment, the system seamlessly integrates with an AI-driven Trust Center and an intricate compliance platform, thereby forging an unparalleled solution that not only ensures regulatory compliance but also elevates operational efficiency to unprecedented heights, setting a new gold standard in the field.

At its very essence, this invention epitomizes a masterful fusion of cutting-edge capabilities meticulously crafted to navigate the intricate nuances of contemporary data privacy compliance. Through the strategic deployment of AI and NLP, the system boasts unparalleled prowess in the interpretation of DSAR submissions, demonstrating remarkable acumen in swiftly and accurately identifying pertinent data while mitigating the risk of errors or oversights that could potentially compromise compliance efforts.

Furthermore, the system boasts advanced automated redaction and anonymization functionalities, leveraging state-of-the-art techniques to safeguard personal data with utmost precision and adherence to the most stringent privacy regulations, all without compromising the operational efficacy essential for streamlined DSAR fulfillment. By seamlessly interfacing with diverse customer databases, it facilitates the seamless management of data, enabling the efficient retrieval, processing, and dissemination of requested information with unmatched ease and efficiency.

In tandem with its robust technological foundation, the system seamlessly integrates with a comprehensive compliance platform, furnishing organizations with a multifaceted framework for ensuring steadfast adherence to regulatory standards. This encompassing suite of features includes an intuitively designed user interface for DSAR submissions, meticulously automated workflow processes for request handling, and a comprehensive metrics dashboard for monitoring and analyzing an extensive array of key performance indicators, thereby empowering organizations to make informed, data-driven decisions and continuously optimize their DSAR fulfillment endeavors with unparalleled precision and finesse.

In summation, this advanced system stands as a true example of the transformative potential inherent in technological innovation within the realm of data privacy compliance. By offering organizations an unparalleled toolkit for achieving and exceeding compliance with data privacy regulations, while simultaneously enhancing operational efficiency and efficacy to unprecedented levels, it not only sets a new benchmark for DSAR fulfillment excellence but also heralds a new era of technological prowess in safeguarding data privacy in the modern digital landscape.

BRIEF DESCRIPTION OF THE DRAWINGS

FIG. 2 is a simplified diagram of a System Overview according to an example of the present invention.

FIG. 3 illustrates a simplified DSAR Submission Process Flowchart according to an example of the present invention.

FIG. 4 illustrates a simplified User Verification Process Diagram according to an example of the present. Invention.

FIG. 5 is a simplified diagram of an AI-Driven Workflow and Data Management according to an example of the present invention.

FIG. 6 is a simplified diagram of a Data Fulfillment and Integration according to an example of the present invention.

FIG. 7 is a simplified diagram of Metrics Dashboard Architecture according to an example of the present invention.

FIG. 8 is a simplified diagram of a Compliance Platform Integration system according to an example of the present invention.

FIG. 9 is a simplified diagram of a Revised Security and Privacy Features according to an example of the present invention.

Figure 1:
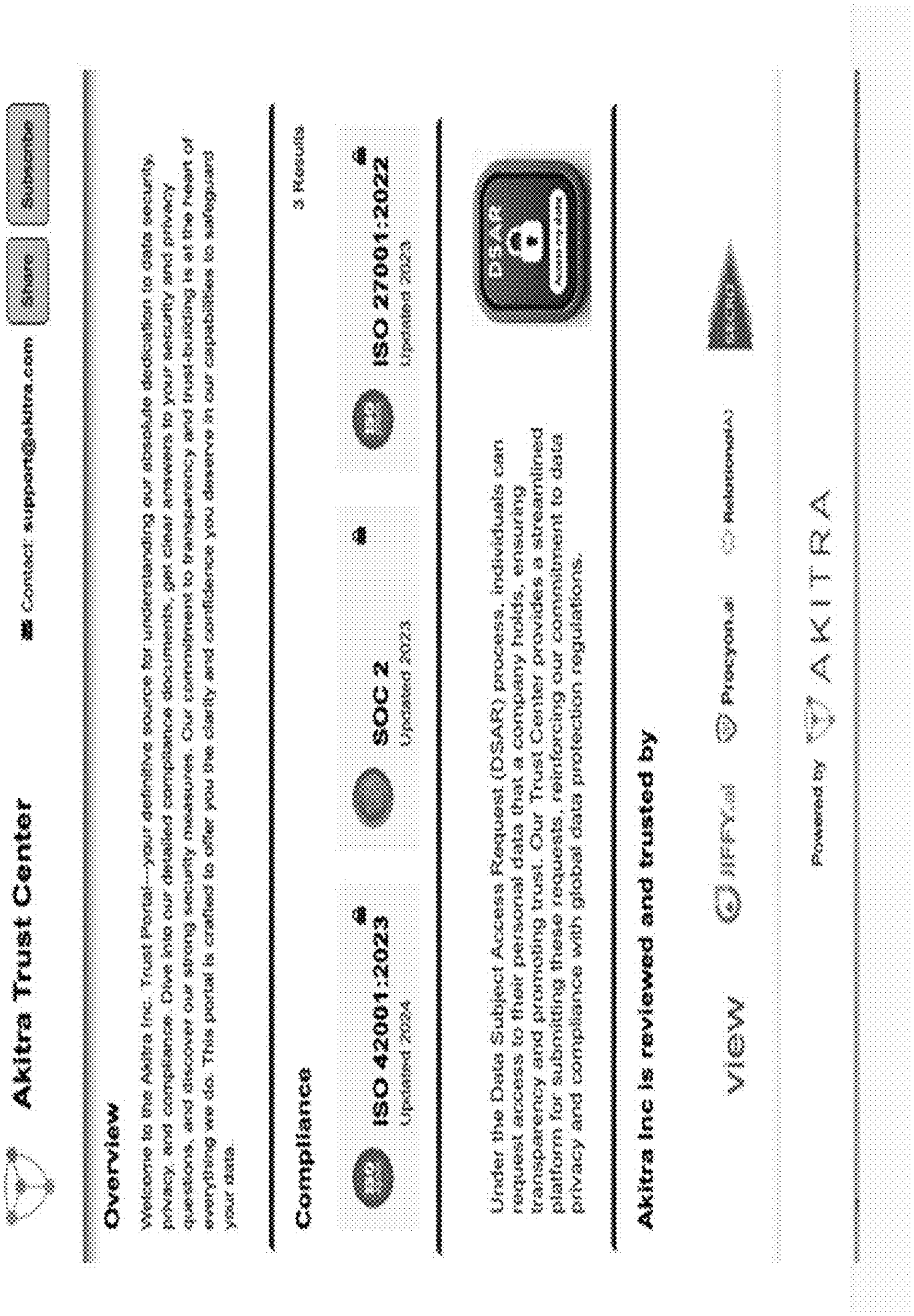
FIG. 1 is a simplified diagram of a Trust Center with the DSAR Request Button according to an example of the present invention.

These diagrams collectively convey the innovative features and operational efficiencies of the system designed for DSAR management, underlining the integration of technology, security, and compliance measures to address the challenges associated with data privacy regulations.

DETAILED DESCRIPTION OF THE EXAMPLES

This section provides a detailed exploration of the examples of the invention, highlighting the integration of advanced components designed to streamline the management and fulfillment of Data Subject Access Requests (DSARs). Through the implementation of cutting-edge technologies, this invention enhances user accessibility, ensures stringent security measures, and maintains rigorous compliance with data privacy regulations. The subsequent descriptions will elucidate the roles and functionalities of each system component, demonstrating their collective contribution to optimizing the DSAR process from initiation through to completion.

Request Submission Module: Utilizes Natural Language Processing (NLP) to enable DSAR submissions in natural language, significantly enhancing accessibility and user experience. This module simplifies the process of initiating DSARs, allowing users to articulate their requests in their own words without the need for understanding complex legal terminologies or system-specific jargon.

Trust Center Integration for DSAR Initiation: Seamlessly integrates DSAR initiation into the Trust Center, providing a user-friendly interface where data subjects can easily start the DSAR process. The Trust Center is designed to be the primary point of contact for individuals seeking to exercise their data rights, featuring a prominently placed DSAR request button, detailed instructions, and access to additional resources. This integration underscores the system's commitment to transparency and ease of use, facilitating a straightforward pathway for data subjects to assert their privacy rights.

Workflow Engine: Employs Artificial Intelligence (AI) to automate the approval and verification processes of DSARs. It also integrates with external services for comprehensive data management, ensuring that each request is processed efficiently and accurately. By leveraging AI, the engine optimizes the workflow, reducing manual intervention and streamlining the overall DSAR handling process.

User Verification Module: Authenticates DSAR requests using robust identification methods to ensure that requests are legitimate and that information is only provided to authorized individuals. This module plays a crucial role in protecting sensitive personal data from unauthorized access, adhering to stringent security standards.

AI-Driven Fulfillment Module: Automatically redacts and anonymizes personal data, intelligently retrieves, and manages user information from customer databases. This module ensures that the data provided in response to DSARs complies with privacy regulations, minimizing the risk of data exposure and enhancing privacy protection.

Metrics Dashboard: Provides detailed analytics on the efficiency and effectiveness of DSAR handling, offering insights into processing times, request volumes, and compliance metrics. The dashboard enables continuous monitoring and optimization of the DSAR process, supporting informed decision-making and process improvement efforts.

Compliance Platform Connection: Ensures real-time compliance with data privacy regulations through an integrated AI-enhanced compliance platform. This connection facilitates ongoing compliance monitoring and regulatory updates, allowing the system to adapt to changing legal landscapes and maintain adherence to global data protection laws.

Collectively, these components represent a holistic approach to managing DSARs, combining user-centric design with advanced technological solutions to meet the challenges of modern data privacy regulations. By integrating these modules into a cohesive system, the invention offers a scalable, secure, and efficient platform for DSAR management, catering to the needs of organizations and data subjects alike.

This section meticulously articulates the operational intricacies, component interactions, and technological advancements embodied within the presented invention. Through an in-depth examination of the accompanying diagrams, this section aims to convey the innovative aspects of the system's design and functionality, specifically tailored for the efficient management of Data Subject Access Requests (DSARs). Each figure is analyzed to illuminate how the invention leverages state-of-the-art technology to enhance user experience, secure data handling, and ensure compliance with regulatory standards. The following narrative details the invention's components, processes, and the synergistic integration that defines its unique contributions to the field, providing a comprehensive understanding of the invention's capabilities and its practical application in addressing contemporary data privacy challenges.

FIG. 1 is a simplified diagram that Illustrates the Trust Center Page, designed as the primary interface for initiating DSARs. Highlights include the strategically placed DSAR button for easy access and additional resources to inform users about their data rights.

This diagram presents a comprehensive visualization of the Trust Center Page, strategically designed to serve as the primary entry point for data subjects wishing to initiate a Data Subject Access Request (DSAR). Centrally located on the Trust Center Page for optimal visibility and accessibility. The DSAR button is strategically placed to capture immediate attention and facilitate ease of use. The button is designed with a distinctive appearance, utilizing contrasting colors to stand out against the page background, ensuring it is immediately identifiable as the mechanism for initiating a DSAR. The Trust Center Page is conceptualized as an integral component of the platform's user interface, meticulously crafted to enhance user engagement, streamline the DSAR initiation process, and uphold the principles of transparency and accessibility in data privacy management.

Links to additional resources, such as FAQs about DSARs, privacy policy details, and contact information for privacy inquiries, are provided in the Trust Center. These resources are intended to educate users about their data rights and offer support for any questions or concerns.

FIG. 2 depicts a structured overview of the system architecture tailored for the processing of Data Subject Access Requests (DSARs). The diagram articulates the sequential flow and integration of critical components, each uniquely identified by a numerical code, representing their respective roles in the DSAR fulfillment process. In an example, the system depicts the system's architecture for DSAR processing, showcasing the integration of components such as DSAR Submission, NLP Interpretation, AI-Driven Fulfillment, and Compliance Platform Integration. This diagram outlines the sequential flow from DSAR initiation to fulfillment.

1. DSAR Submission (201): This component acts as the initial contact point for data subjects wishing to initiate a DSAR. It is responsible for capturing and registering DSARs into the system. The DSAR Submission module (201) facilitates the collection of requests from users, marking the beginning of the DSAR processing journey.
2. NLP Interpretation (202): Once a DSAR is submitted, it proceeds to the NLP Interpretation module (202). This stage employs Natural Language Processing algorithms to interpret the content of the DSAR submitted in natural language. The NLP Interpretation component (202) plays a crucial role in ensuring that the DSARs are understood correctly, enabling precise and efficient processing of the requests.
3. AI-Driven Fulfillment (203): Following the interpretation of DSARs, the AI-Driven Fulfillment module (203) takes over. It utilizes artificial intelligence to manage the data retrieval and processing necessary for DSAR fulfillment. The AI-Driven Fulfillment component (203) is instrumental in ensuring the timely and accurate delivery of requested information to data subjects, leveraging advanced AI technologies to optimize the fulfillment process.
4. Compliance Platform Integration (204): The culmination of the DSAR process involves integration with the Compliance Platform (204). This component ensures that the entire DSAR processing workflow remains in strict adherence to relevant data protection regulations and compliance standards. The Compliance Platform Integration (204) underscores the system's commitment to regulatory compliance, facilitating real-time monitoring and adherence to privacy laws.

Through the logical sequencing and integration of these components, FIG. 2 elucidates the system's sophisticated approach to DSAR processing. The diagram highlights the technology-driven architecture designed to enhance operational efficiency, ensure compliance with data privacy regulations, and ultimately streamline the DSAR fulfillment experience for both organizations and data subjects.

FIG. 3 presents the DSAR Submission Process Flowchart, offering a detailed visualization of the stages involved in handling a Data Subject Access Request from its initiation to completion. The flowchart incorporates decision nodes to dynamically address the specifics of each DSAR, utilizing technology to streamline the process. As shown, the Figure presents a flowchart detailing the stages of DSAR handling, from receipt and NLP interpretation to automated workflow decisions and final fulfillment or rejection. It emphasizes the system's use of technology to streamline DSAR processing.

1. DSAR Received (301): This stage marks the beginning of the process, where the system receives a DSAR submission from a data subject. It's the entry point into the DSAR handling workflow within the system.
2. Interpret Using NLP (302): Directly after a DSAR is received, it progresses to the NLP (Natural Language Processing) interpretation stage (302). This essential step utilizes NLP algorithms to decode and understand the DSAR submissions articulated in natural language. This accurate interpretation is crucial for processing the DSARs appropriately, ensuring that the requests are comprehended accurately and positioned for efficient processing.
3. Automated Workflow (WF) (303): Upon successful interpretation by the NLP algorithms, the DSAR enters the Automated Workflow phase (303). This component signifies the system's capability to advance DSAR requests through predefined automated processes, aiming to minimize manual interventions and boost processing efficiency. The workflow encompasses a series of automated checks and actions designed to expedite the DSAR handling process.

4. Approval Needed (304): Within the automated workflow, there is a critical decision point (304) to ascertain whether the DSAR requires manual approval. This node evaluates the DSAR against set criteria to determine if it can be processed automatically or needs manual intervention.

Fulfill DSAR (305): If the DSAR meets the criteria for automated processing (Yes from 304), the process advances to the Fulfillment stage (305), where the DSAR is completed. In this phase, the necessary data is retrieved, processed, and made ready for provision to the data subject, effectively concluding the DSAR request.

Reject (306): Alternatively, if the DSAR requires but does not receive manual approval (No from 304), the process moves to the Rejection phase (306). Here, the request is formally declined, and the system notifies the data subject of the decision, thereby closing the loop on this specific DSAR.

By structuring the DSAR submission process as delineated in FIG. 3, the system ensures efficient, accurate, and complaint handling of DSARs. This flowchart exemplifies the system's reliance on NLP for precise DSAR interpretation and an automated workflow to streamline processing, culminating in a responsive and effective DSAR fulfillment mechanism.

FIG. 4 illustrates the User Verification Process in a simplified diagrammatic form, an essential aspect of the present invention aimed at authenticating the identity of requestors. The process is meticulously designed to protect sensitive data and ensure compliance with regulatory standards by securely validating user identities before granting access to personal data. Each step in the process, marked by a unique identifier, plays a crucial role in ensuring the integrity and security of the data access procedure. As shown, the Figure illustrates steps involved in verifying the identity of DSAR requestors, starting with the collection of user information and culminating in access being granted upon successful verification. This diagram underscores the importance of security in the DSAR process.

1. DSAR Request (401): This stage marks the initiation of the user verification process, where a Data Subject Access Request (DSAR) is received by the system. The DSAR Request (401) serves as the trigger for the subsequent user verification steps, indicating that a user wishes to access their personal data.
2. Collect User Information (402): Upon receipt of a DSAR, the system proceeds to the Collect User Information stage (402). In this phase, essential details about the user are gathered, which are critical for the verification process. The collection of user information is the foundational step towards establishing the identity of the requestor, ensuring that the verification process is grounded in accurate and relevant data.
3. Verify Identity (403): Following the collection of user information, the process advances to the Verify Identity stage (403). This pivotal phase involves a series of authentication measures designed to meticulously confirm the identity of the requestor. Through validation of the user's credentials and cross-referencing with stored data, this step addresses the risk of unauthorized access by ensuring that only legitimate requests are honored. The Verify Identity stage is integral to maintaining the security and privacy of the data, embodying the system's commitment to upholding high standards of data protection.
4. Access Granted (404): Upon successful verification of the requestor's identity, the process culminates at the Access Granted stage (404). This final step signifies the authorization of the user to access the requested personal data. Granting access follows a thorough verification procedure, emphasizing controlled and secure data access in alignment with privacy principles and compliance requirements.

FIG. 4, as described, provides a comprehensive overview of the User Verification Process within the system, detailing each critical step from the initiation of a DSAR to the granting of access post-verification. This diagram, along with the detailed explanation, showcases the system's robust mechanisms for protecting user privacy and securing personal data, illustrating the thorough and systematic approach to user verification designed to prevent unauthorized access and ensure regulatory compliance.

FIG. 5 delineates a streamlined AI-Driven Workflow and Data Management process tailored for Data Subject Access Request (DSAR) fulfillment. This diagram systematically visualizes the integral components and sequential steps employed by the system to automate DSAR processing, showcasing how AI technologies are harnessed to enhance efficiency, ensure data privacy, and uphold regulatory compliance. As shown, the Figure Illustrates the AI-Driven Workflow and Data Management process, detailing steps from DSAR approval through data retrieval and AI-driven redaction/anonymization to compliance checks. It highlights the role of AI in enhancing DSAR fulfillment efficiency and privacy compliance.

1. DSAR Approval (501): The process initiates at the DSAR Approval stage (501), where DSAR submissions are evaluated and approved for further processing. This initial step ensures that each DSAR meets the criteria for processing, marking the commencement of the automated workflow designed to handle the request efficiently.
2. Data Retrieval (502): Following approval, the workflow advances to the Data Retrieval phase (502), where AI-driven mechanisms are employed to locate and extract the specific data requested in the DSAR. The Data Retrieval component utilizes sophisticated algorithms to intelligently search and gather the necessary data from various data repositories, optimizing the retrieval process for speed and accuracy.
3. Redaction & Anonymization (AI-Driven) (503): The extracted data then proceeds to the Redaction and Anonymization stage (503), a critical component of the process where AI-driven tools are applied to meticulously redact sensitive information and anonymize personal data. This step is pivotal in protecting the privacy of individuals and ensuring that the data provided in response to DSARs complies with data protection regulations. By leveraging AI for redaction and anonymization, the system significantly reduces the risk of data breaches and unauthorized disclosure of personal information.
4. Compliance Checks (504): The final phase of the workflow involves Compliance Checks (504), where the processed data is scrutinized against compliance standards and regulations before being released. This stage ensures that all DSAR fulfillments adhere to legal requirements, data protection policies, and privacy norms. The Compliance Checks component acts as a quality assurance measure, validating the integrity of the DSAR fulfillment process and safeguarding against non-compliance.

FIG. 5, as elaborated, offers a comprehensive overview of the AI-Driven Workflow and Data Management process, underlining the system's capacity to automate DSAR processing through the integration of AI technologies. By detailing the sequential operations from DSAR approval to compliance verification, the diagram exemplifies the system's commitment to leveraging technological advancements for enhancing data privacy, operational efficiency, and regulatory adherence. This detailed provides a clear understanding of the sophisticated mechanisms and innovative approaches employed by the system to streamline DSAR fulfillment processes.

FIG. 6 provides a succinct yet detailed visualization of the Data Fulfillment and Integration process, illustrating the systematic approach employed by the system to efficiently handle and fulfill data requests. This diagram captures the sequential steps and the integration of technological components essential for the sophisticated management of data, emphasizing the pivotal role of artificial intelligence (AI) in optimizing data processing. As shown, the Figure describes the process of fulfilling data requests through database integration and AI-driven data management, ensuring efficient and accurate handling of requested information.

1. Data Request Fulfillment (601): This stage marks the initiation of the data fulfillment process. Upon receipt of a data request, the system activates its fulfillment protocols to process the request effectively. The Data Request Fulfillment component (601) is responsible for initiating the sequence of operations that will lead to the retrieval and processing of the requested data, ensuring that the system is primed to meet the specific requirements of the data request.
2. Database Integration (602): Following the initiation of the data request fulfillment, the process advances to the Database Integration phase (602). This crucial step involves the intelligent integration of the system's databases, facilitating seamless access to the necessary data repositories. The Database Integration component ensures that data can be efficiently retrieved from various sources, highlighting the system's ability to consolidate and harmonize data across different storage locations for optimal retrieval efficiency.
3. AI-Driven Data Management (603): The culmination of the process is marked by the AI-Driven Data Management stage (603), where the retrieved data is processed and managed using advanced AI algorithms. This final step involves the application of AI technologies to analyze, organize, and prepare the data according to the request's specifications. The AI-Driven Data Management component is instrumental in ensuring that the data is handled with precision and accuracy, employing algorithms for tasks such as data cleansing, classification, and anomaly detection to enhance the quality and relevance of the data provided.

FIG. 6, through its detailed depiction of each step in the Data Fulfillment and Integration process, illustrates the system's commitment to leveraging cutting-edge AI technologies and database integration strategies to ensure the efficient and accurate handling of data requests. This diagram and accompanying explanation aim to provide a clear understanding of the innovative methodologies and technological capabilities that underpin the system's approach to data management, emphasizing the system's effectiveness in meeting the demands of data request fulfillment with unprecedented efficiency and precision.

FIG. 7 illustrates the architecture of the Metrics Dashboard, a key component of the present invention designed to offer a detailed overview of DSAR (Data Subject Access Request) fulfillment performance. This diagram visually represents the orchestrated flow of data from the initial collection of DSAR requests through to the presentation of performance metrics on the dashboard, underscoring the system's commitment to enhancing transparency, accountability, and data-driven decision-making within organizational processes. As shown, the Figure depicts the architecture of the Metrics Dashboard, focusing on the collection of DSAR request data, AI analytics, performance metrics calculation, and dashboard presentation. It illustrates the system's approach to tracking and analyzing DSAR fulfillment performance.

1. DSAR Requests (701): The process begins with the collection of DSAR Requests (701), serving as the data input for the Metrics Dashboard. This stage captures all DSAR submissions received by the system, forming the foundational dataset from which performance insights will be derived.
2. AI Analytics (702): Following data collection, the DSAR request data proceeds to the AI Analytics stage (702). Here, sophisticated AI algorithms analyze the collected data to identify trends, patterns, and insights relevant to DSAR processing. The AI Analytics component is pivotal in transforming raw data into actionable information, enabling the system to process and interpret DSAR data with a high degree of precision and efficiency.
3. Performance Metrics (703): The insights generated by AI Analytics then feed into the Performance Metrics stage (703). In this phase, key performance indicators (KPIs) and metrics relevant to DSAR fulfillment are calculated and compiled. The Performance Metrics component plays a critical role in quantifying the effectiveness, efficiency, and compliance of the DSAR processing workflow, providing a quantifiable basis for performance evaluation.
4. Dashboard (704): Finally, the processed data and performance metrics are presented on the Dashboard (704). This stage visualizes the performance data in an intuitive and accessible manner, offering stakeholders a comprehensive view of DSAR fulfillment performance. The Dashboard facilitates easy access to key metrics and insights, enabling decision-makers to monitor, analyze, and optimize DSAR processes based on data-driven evidence.

FIG. 7, as described, offers a comprehensive visualization of the Metrics Dashboard Architecture, highlighting the systematic approach employed by the system to monitor and analyze DSAR fulfillment performance. By integrating AI analytics and performance metrics into a cohesive dashboard, the system empowers organizations to achieve greater insight into their DSAR processes, fostering an environment of continuous improvement and strategic decision-making based on actionable data insights. This detailed explanation aims to provide a clear understanding of the innovative architecture and functionality of the Metrics Dashboard, illustrating its significance in enhancing the management and optimization of DSAR fulfillment processes.

FIG. 8 unveils the architecture of the Compliance Platform Integration system, a cornerstone of the present invention designed to ensure that Data Subject Access Request (DSAR) processing aligns with regulatory requirements while maintaining operational efficiency and data integrity.

1. Trust Center (801): The Trust Center (801) acts as the initial interface for individuals initiating DSARs. It functions as a secure portal where data subjects can submit their requests for data access, correction, or deletion in compliance with data protection laws. The Trust Center serves as a user-centric platform that simplifies the DSAR submission process, enhancing accessibility and user engagement.

2. Compliance Platform (802): The Compliance Platform (802) represents the core of the system's regulatory adherence mechanisms. It is intricately linked to the Trust Center, facilitating a real-time exchange of information to ensure that DSAR processing is conducted in accordance with legal and regulatory standards. The Compliance Platform incorporates advanced algorithms and regulatory databases to continuously monitor compliance requirements, adapting to changes in legislation and ensuring that the Trust Center's operations remain within legal boundaries.
3. DSAR Processing (803): Positioned as a bridge between the Trust Center and the Compliance Platform, DSAR Processing (803) encompasses the system's operational procedures for handling and responding to DSAR submissions. This component automates the evaluation, processing, and fulfillment of DSARs, leveraging the information and guidelines provided by the Compliance Platform to execute tasks in a manner that respects data privacy laws and organizational policies.
4. Regulatory Monitoring (804): Regulatory Monitoring (804) is a critical function of the Compliance Platform, dedicated to overseeing the system's adherence to data protection regulations and standards. It assesses the DSAR Processing operations against current regulatory requirements, identifies potential compliance risks, and provides feedback to ensure that DSAR handling procedures are updated in line with evolving legal landscapes. This proactive monitoring facilitates a dynamic response to regulatory changes, safeguarding the organization against non-compliance and enhancing trust among stakeholders.

FIG. 8, through its comprehensive depiction, demonstrates the seamless integration between the Trust Center and the Compliance Platform, underlining the system's commitment to facilitating DSAR processing in a secure, efficient, and legally compliant manner. By detailing the real-time linkage and the roles of each component within the system, this diagram aims to provide a clear understanding of the innovative mechanisms employed to maintain regulatory compliance while optimizing the DSAR management process. This integrated approach not only streamlines DSAR processing but also ensures that the organization can effectively monitor and adapt to regulatory requirements, thereby reinforcing the system's role in fostering transparency and trust in data management practices. As shown, the Figure shows the integration between the Trust Center and the Compliance Platform, emphasizing the real-time linkage for DSAR processing and regulatory monitoring. This diagram highlights the system's commitment to regulatory compliance and data management efficiency.

FIG. 9 now presents a streamlined depiction of the Security and Privacy Features framework within the system, highlighting the sequence of steps designed to protect data, secure access, and ensure comprehensive privacy management. As shown, the Figure outlines the structured implementation of security and privacy features within the system, including encryption, multi-factor authentication, and privacy protections. It demonstrates the system's comprehensive approach to protecting sensitive data and maintaining use privacy throughout the DSAR process.

1. Encryption (Data in Transit & at Rest) (901): This foundational layer of security applies robust encryption protocols to all data, both as it moves through the system (in transit) and when stored within the system's databases (at rest). Encryption (901) acts as the first line of defense, ensuring that sensitive information is rendered unreadable to unauthorized parties, thereby safeguarding data integrity and confidentiality.
2. Multi-factor Authentication (902): Following the encryption of data, Multi-factor Authentication (902) introduces a critical security checkpoint for accessing the system. This stage requires users to provide multiple forms of verification before being granted access, significantly enhancing security by reducing the risk of unauthorized access. This authentication mechanism ensures that only verified users can interact with or access the encrypted data, adding a robust layer of security that complements data encryption.
3. Privacy Protections (903): With data encrypted and access secured, Privacy Protections (903) encompass the overarching privacy measures and policies implemented across the system to manage and protect personal information responsibly. This final component integrates privacy-by-design principles, regulatory compliance measures, and ethical handling practices into all aspects of the DSAR process. Privacy Protections ensure that the system not only meets legal requirements but also aligns with best practices in privacy management, completing the security and privacy framework.

FIG. 9 illustrates the logical progression of implementing security and privacy features in the system, from securing the data itself to controlling access to it, and finally to managing it in a privacy-conscious manner. This structured approach underscores the system's comprehensive commitment to maintaining high standards of security and privacy, that underpins the system's operations. Through this sequential depiction, the diagram conveys the interconnectedness of these features, demonstrating how they collectively form a robust defense mechanism to protect sensitive information and uphold user privacy throughout the DSAR process.

In an example, the present invention provides a system for processing Data Subject Access Requests (DSARs). The system has a trust center coupled to a world wide network of computers, a request submission module coupled to the trust center and capable of receiving a DSAR and configured to interpret the DSAR in natural language through a Natural Language Processing (NLP) engine from a first format to a second format. In an example, the system has a trust center interface coupled to the trust center and configured to initiate the DSAR; and output a DSAR request button, one or more instructions for submitting requests, and access to informational resources. In an example, the system has an automated workflow engine coupled to the trust center and employing Artificial Intelligence (AI) for configured for automating DSAR approval, verification, and integration with an external service for data retrieval and a user verification module coupled to the trust center configured with one or more identification methods to authenticate an identity of one or more requestors of the DSAR to authorize access to information. In an example, the system has an AI-driven fulfillment module configured for an automatic redaction and anonymization of personal data and data retrieval and management from one or more customer databases. In an example, the system has a metrics dashboard configured with the trust center and adapted for providing one or more analytics on DSAR such that the analytics includes at least one or more of handling efficiency, including a metric on a processing time, a request volume, and a compliance metrics. In an example, the system has a compliance platform connection coupled to the trust center and configured for a real-time adherence to one or more data privacy regulations through an AI-enhanced compliance platform to facilitate ongoing compliance monitoring and updates.

In an example, the request submission module is further configured for: supporting voice recognition to allow DSAR through a voice command; automatically categorizing one or more DSAR using a type of request and data on subject's information.

In an example, the automated workflow engine is further configured to: dynamically prioritize a DSAR processing based on a predefined criteria including one or more of a complexity, an urgency, and data subject's jurisdiction; and automatically escalate a complex DSAR to a handling team.

In an example, the user verification module comprise a biometric verification selected from one of a fingerprint or a facial recognition for a multi-factor authentication and a secure token or OTP (One-Time Password) generation device configured to verifying a user identity.

In an example, the AI-driven fulfillment module comprises: a deep learning module configured for improving an accuracy of data redaction and anonymization over a time period; and a predictive analytics configured for anticipating a type of data a requestor is seeking.

In an example, the system has a dynamic sensitivity assessment module comprising a machine learning module configured to continuously evaluate and adjust a sensitivity classification of one or more data elements in real-time; and an AI-driven recommendation engine configured within the metrics dashboard configured for generating a procedural improvement based on an analysis of a DSAR handling trend and a regulatory change.

In an example, the compliance platform connection is configured to an automated update to DSAR handling protocols in response to changes in data protection laws and generation of a compliance report detailing a DSAR processing activity and an adherence to regulatory requirements.

In an example, the system is configured for interpreting a DSAR submission in natural language using NLP to capture a requestor's intent; authenticating a requestor's identity through a multi-factor authentication process involving biometric verification and secure token generation; utilizing AI to automate an approval of DSARs and a retrieval and processing of a requested data; implementing AI-driven redaction and anonymization to ensure a privacy of the data provided in response to DSAR; and analyzing a DSAR processing and compliance through the Metrics Dashboard to identify areas.

In an example, the system is configured for a dynamic prioritization of DSAR based on at least one or more of an urgency, a complexity, and a regulatory deadlines; and an automated escalation of a complex DSAR to a handling team.

In an example, the system is configured for a continuous learning and adaptation of AI algorithms within the AI-driven fulfillment module for precision of data redaction and anonymization; and a real-time adjustment of a data sensitivity classification using a Dynamic Sensitivity Assessment Module for a context and a regulation.

In an example, the system has a dynamic data sensitivity assessment module configured with one or more machine learning devices to evaluate a sensitivity level of one or more data elements in a real-time. In an example, the NLP engine is adapted and learn from one or more user interactions.

In an example, the system has a report module configured to generating a compliance report for each DSAR fulfillment, such that the compliance report comprises one or more actions taken and one or more compliance checks performed. In an example, the system has an AI-driven recommendation engine for suggesting modifications to a DSAR handling procedure using a regulatory trend and an efficiency metric. In an example, the system has a predictive analytics module within a metrics dashboard for forecasting one or more DSAR volumes and processing times. In an example, the AI-driven fulfillment module includes an automated document classification and tagging system. In an example, the system has a security module configured for protection of a sensitive data during a DSAR fulfillment. In an example, the security module is configured with an end-to-end encryption. In an example, the NLP engine comprises a multi-lingual support within the NLP processes enabling processing of DSARs in multiple languages.

In an example, the present invention provides a method for fulfilling DSARs. The method includes receiving DSARs expressed in natural language and interpreting them using NLP algorithms, automating DSAR approval and user identity verification, fulfilling requests through an AI-driven process that includes the automated redaction and anonymization of personal data, and intelligent integration with customer databases for data retrieval, tracking and analyzing DSAR processing metrics via a dedicated dashboard, and accessing real-time compliance status through the compliance platform for regulatory adherence.

In an example, the method includes involving an automated feedback loop where user satisfaction ratings are used to train AI models for continuous improvement. The method includes a step of using machine learning to improve the selection criteria for automated DSAR approval, based on historical data. The method includes adjusting DSAR procedures based on compliance platform updates and AI-driven insights for continuous alignment with regulations. In an example, the method includes fulfilling DSARs, further comprising secure and compliant data provision to requestors, leveraging automated processes for data redaction and anonymization.

In an example, the present techniques include self audit. In an example, the present self audit includes use of GenAI (Generative AI) to determine requirements for controls. Additionally, the technique includes use of GenAI to provide mitigation strategies to make controls compliant, use of GenAI to determine if Policies and Evidence for Controls are compliant, and use of GenAI to provide alternative strategies for controls. In an example, the technique includes use of GenAI to provide Security requirements and recommendations for various questions around security and privacy.

In an example, one or more of these techniques can be performed in conjunction with a handler.

In an example, the term "handler" for input data is responsible for managing the data that is provided as input to a computing process. The handler is typically responsible for performing a variety of functions. In an example, the handler will validate the input data to ensure that it meets one or more requirements of the computing process. The requirements include checking for missing or invalid data, and ensuring that the data is in the correct format. In an example, the handler may perform pre-processing on the input data to prepare it for use by the computing process. This may include tasks such as cleaning the data, transforming it into a different format, or normalizing it. In an example, the handler may store the input data in a suitable location, such as a database or file system, to make it available for later use. In an example, the handler may retrieve the input data from the storage location when it is required by the computing process.

On the other hand, a handler for output data is responsible for managing the data that is produced as output by a computing process. This handler is typically responsible for performing one or more functions. In an example, the handler may perform post-processing on the output data to transform it into a format that is suitable for use by downstream processes or applications. In an example, the handler may store the output data in a suitable location, such as a database or file system, to make it available for later use. In an example, the handler may retrieve the output data from the storage location when it is required by downstream processes or applications. In an example, the handler may transmit the output data to other systems or applications that desire it.

In an example, various hardware elements of the invention can be implemented using a "pizza box" computer also called a rack or tower server or using a smart phone according to an embodiment of the present invention.

Additionally, these devices or micro devices such as smart phones include a housing, display, and interface device, which may include a button, microphone, or touch screen. Preferably, the phone has a high-resolution camera device, which can be used in various modes. An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the mobile device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A system for processing Data Subject Access Requests (DSARs), the system comprising:
a data source coupled to a network comprising the world wide network of computers;
a router coupled to the data source;
a switch device coupled to the router;
a trust center under control of a processing device, coupled to the world wide network of computers;
a request submission module under control of the processing device coupled to the trust center through the network and capable of receiving a DSAR and configured to interpret the DSAR in natural language through a Natural Language Processing (NLP) engine from a first format to a second format;
a trust center interface under control of the processing device coupled to the trust center through the network and configured to initiate the DSAR; and output a DSAR request button, one or more instructions for submitting requests, and access to informational resources;
an automated workflow engine under control of the processing device coupled to the trust center and employing Artificial Intelligence (AI) for configured for automating DSAR approval, verification, and integration with an external service for data retrieval;
a user verification module under control of the processing device coupled to the trust center configured with one or more identification methods to authenticate an identity of one or more requestors of the DSAR to authorize access to information;
an AI-driven fulfillment module configured for an automatic redaction and anonymization of personal data and data retrieval and management from one or more customer databases;
a metrics dashboard configured with the trust center and adapted for providing one or more analytics on DSAR such that the analytics includes at least one or more of handling efficiency, including a metric on a processing time, a request volume, and a compliance metrics;
a compliance platform connection coupled using the network to the trust center and configured for a real-time adherence to one or more data privacy regulations through an AI-enhanced compliance platform to facilitate ongoing compliance monitoring and updates;
a memory resource coupled to the trust center, the memory resource comprising a secure token or OTP (One-Time Password) generation device configured to verifying a user identity
whereupon the processing device comprises one or more processing devices.

2. The system of claim 1, wherein the request submission module is further configured for: supporting voice recognition to allow DSAR through a voice command; automatically categorizing one or more DSAR using a type of request and data on subject's information.

3. The system of claim 1, wherein the automated workflow engine is further configured to:
dynamically prioritize a DSAR processing based on a predefined criteria including one or more of a complexity, an urgency, and data subject's jurisdiction;
automatically escalate a complex DSAR to a handling team.

4. The system of claim 1, wherein the user verification module comprising:
a biometric verification selected from one of a fingerprint or a facial recognition for a multi-factor authentication.

5. The system of claim 1, wherein the AI-driven fulfillment module comprises:
a deep learning module configured for improving an accuracy of data redaction and anonymization over a time period;
a predictive analytics configured for anticipating a type of data a requestor is seeking.

6. The system of claim 1 further comprising:
a dynamic sensitivity assessment module comprising a machine learning module configured to continuously evaluate and adjust a sensitivity classification of one or more data elements in real-time; and
an AI-driven recommendation engine configured within the metrics dashboard configured for generating a procedural improvement based on an analysis of a DSAR handling trend and a regulatory change.

7. The system of claim 1, wherein the compliance platform connection is configured to:
an automated update to DSAR handling protocols in response to changes in data protection laws; and
generation of a compliance report detailing a DSAR processing activity and an adherence to regulatory requirements.

8. The system of claim 1 wherein the system is configured for:
interpreting a DSAR submission in natural language using NLP to capture a requestor's intent;
authenticating a requestor's identity through a multifactor authentication process involving biometric verification and secure token generation;
utilizing AI to automate an approval of DSARs and a retrieval and processing of a requested data;
implementing AI-driven redaction and anonymization to ensure a privacy of the data provided in response to DSAR; and
analyzing a DSAR processing and compliance through the Metrics Dashboard to identify areas.

9. The system of claim 8 wherein the system is configured for:
a dynamic prioritization of DSAR based on at least one or more of an urgency, a complexity, and a regulatory deadlines; and
an automated escalation of a complex DSAR to a handling team.

10. The system of claim 9, wherein the system is configured for:
a continuous learning and adaptation of AI algorithms within the AI-driven fulfillment module for precision of data redaction and anonymization; and
a real-time adjustment of a data sensitivity classification using a Dynamic Sensitivity Assessment Module for a context and a regulation.

11. The system of claim 1 further comprising a dynamic data sensitivity assessment module configured with one or more machine learning devices to evaluate a sensitivity level of one or more data elements in a real-time.

12. The system of claim 1 wherein the NLP engine is adapted and learn from one or more user interactions.

13. The system of claim 1 further comprising a report module configured to generating a compliance report for each DSAR fulfillment, such that the compliance report comprises one or more actions taken and one or more compliance checks performed.

14. The system of claim 1 further comprising an AI-driven recommendation engine for suggesting modifications to a DSAR handling procedure using a regulatory trend and an efficiency metric.

15. The system of claim 1 further comprising a predictive analytics module within a metrics dashboard for forecasting one or more DSAR volumes and processing times.

16. The system of claim 1 wherein the AI-driven fulfillment module includes an automated document classification and tagging system.

17. The system of claim 1 further comprising a security module configured for protection of a sensitive data during a DSAR fulfillment, the security module is configured with an end-to-end encryption.

18. The system of claim 1 wherein the NLP engine comprises a multi-lingual support within the NLP processes enabling processing of DSARs in multiple languages.

* * * * *